Patented Feb. 16, 1943

2,310,937

UNITED STATES PATENT OFFICE

2,310,937
PAIN-ALLEVIATING MATERIAL

Hendry C. Connell, Kingston, Ontario, Canada, assignor to Canadian-American Pharmaceutical Company, Wilmington, Del., a corporation of Delaware No Drawing. Application April 20, 1937, Serial No. 137,931. In Belgium May 2, 1935

10 Claims. (Cl. 167—78)

This invention relates to a process for producing a substance capable of reducing the discomforts of growths in the human body of proteins foreign thereto, and more particularly refers to a process for producing a material which will reduce the pain resulting from carcinoma, sarcoma and other cancerous growth in the human body, and the products thereof.

As is well known, the growth in the human body of proteins foreign thereto is frequently accompanied by pain of varying severity. This is particularly true of malignant growths such as carcinoma and sarcoma, where the person afflicted is commonly subjected to excruciating pains as the disease progresses. The most common method of alleviating this pain was to inject opiates, such as morphine, into the body of the afflicted person thereby deadening the nervous system and alleviating to a certain extent the symptoms of pain. This procedure is generally conceded to be subject to many disadvantages. For instance, after a patient receives frequent injections of opiates he develops a resistance thereto requiring the amount used to be greatly increased, until finally a dosage is reached which cannot be safely exceeded and which does not deaden the pains caused by the disease. Furthermore, the administration of this treatment renders the individual treated semi-conscious and robs him to a considerable degree of the use of his faculties. When this treatment has finally reached the stage where it is no longer helpful medical science has resorted to an operation whereby portions of the nervous system are severed, thereby paralyzing the affected area. Obviously, this latter treatment is extreme and is only resorted to where the afflicted individual can no longer stand the pain resulting from the disease and where all hope of recovery has been given up. If there is any possibility of the patient recovering it would be exceedingly unwise to sever portions of the nervous system as this would result in complete and permanent paralysis of localized areas in the body.

It is an object of this invention to provide a substance capable of reducing the pain resulting from the presence or growth of foreign proteins in the human body. A further object is to produce a substance which may accomplish this desirable objective and still permit the individual treated to retain complete control of his faculties. A further object is to produce a substance which will reduce the pain resulting from carcinoma and other cancerous growths without at the same time impairing the health of the individual treated. A still further object is to produce a material which may be used over long periods of time without any harm to the individual treated and without any habit-forming tendencies. Additional objects will become apparent from a consideration of the following description and claims.

These objects are attained according to the herein described invention which broadly comprises growing a proteolytic micro-organism on a protein foreign to the human body for a sufficient period of time to at least partially decompose said protein and thereafter extracting therefrom the liquid products produced thereby, said liquid products possessing the property of reducing the discomforts of growths in the human body of proteins foreign thereto.

In a more limited sense this invention is directed to a process for producing a pain-alleviating substance which comprises growing a proteolytic micro-organism on cancer tissue for a sufficient period of time to at least partially decompose said cancer tissue, and extracting therefrom the liquid products produced thereby.

In its preferred embodiment this invention is concerned with a pain-alleviating product which is produced by seeding human carcinoma tissue with *Cl. histolyticum* or *Cl. sporogenes* or a mixture of the two, which mixture might include the intermediate stages wherein one is converted to the other, incubating the seeded culture medium under anaerobic conditions for a sufficient period of time and under such conditions that the seeded tissue is partially destroyed, then separating the liquid from the solid portion of the resulting incubation mass and sterilizing said liquid. This liquid may be introduced into the body by intramuscular injection, or by other common expedients, and results in an appreciable reduction in the pain which is caused by carcinoma and other cancerous growths therein.

The invention may be more readily understood by a consideration of the following illustrative examples, wherein products were obtained which were satisfactory for the alleviation of pain resulting from the presence or growth of foreign proteins in the human body.

Example 1

10 grams of human carcinoma tissue, freed from all normal tissue, is washed free from blood as far as possible. 1 gram of the tissue is then placed in a sterile test-tube with 10 ccs. of 0.85% NaCl solution. The contents of the tube is inoculated or seeded with pure culture *B. histolyticus*, covered with petroleum jelly in the usual anaerobic manner and incubated at 37.5° C. for four to five days. When the fluid in the test-tube shows by macroscopic inspection that it is non-colloidal, it is centrifuged. After centrifuging, the fats and fibrous tissue are separated and the remaining liquid filtered through a Berkefeld filter. When it has been filtered the liquid is tested for viability and is kept in a sterile stoppered vaccine phial. So long as it is sterile it is ready for use at any time.

Example 2

Cancer tissue taken during postmortem from a patient who has died of carcinoma is minced finely under sterile conditions after the majority of the normal tissue is removed therefrom. To 300 grams of this minced tissue is added 600 ccs. of 0.85% sodium chloride in distilled water. This tissue is placed in a sterile flask and inoculated with B. histolyticus. The flask is then sealed with vaseline and mineral oil for anaerobic cultivation in accordance with the usual procedure. The resulting culture is incubated at 37.5° C. until the murky supernatant fluid becomes clear. This incubation period usually requires several days. The culture flask is then placed in a bath of cool running water until the vaseline-oil mixture is semi-solid, whereupon the contents are decanted and strained through glass wool to remove the large particles of solid contained therein. The filtered fluid is then decanted into 50 cc. tubes and centrifuged at 2000 R. P. M. for ½ an hour. The centrifuged fluid is then filtered through a 5 inch N porosity Berkefeld candle. The filtrate from the 5 inch Berkefeld candle is then passed through a 2½ inch N porosity Berkefeld candle, which has been previously autoclaved to sterilization. The resulting sterile filtrate is then bottled under sterile conditions. The last few drops of this filtrate are used for a viability test in order to check the sterility. This product, which possesses the property of alleviating pain when injected into a cancerous patient, may be stored in an icebox for long periods of time without appreciable diminution in potency.

When this example is repeated substituting sarcoma for carcinoma tissue a product with satisfactory pain-alleviating properties is obtained.

Example 3

Cancer tissue taken during postmortem from a patient who has died of carcinoma is minced finely under sterile conditions after the majority of the normal tissue is removed therefrom. To 300 grams of this minced tissue is added 600 ccs. of 0.85% sodium chloride in distilled water. This tissue is placed in a sterile flask and inoculated with Cl. sporogenes. The flask is then sealed with vaseline and mineral oil for anaerobic cultivation in accordance with the usual procedure. The resulting culture is incubated at 37.5° C. until the murky supernatant fluid becomes clear. This incubation period usually requires several days. The culture flask is then placed in a bath of cool running water until the vaseline-oil mixture is semi-solid, whereupon the contents are decanted and strained through glass wool to remove the large particles of solid contained therein. The filtered fluid is then decanted in 50 cc. tubes and centrifuged at 2000 R. P. M. for ½ an hour. The centrifuged fluid is then filtered through a 5 inch N porosity Berkefeld candle. The filtrate from the 5 inch Berkefeld candle is then passed through a 2½ inch N porosity Berkefeld candle, which has been previously autoclaved to sterilization. The resulting sterile filtrate is then bottled under sterile conditions. The last few drops of this filtrate are used for a viability test in order to check the sterility. This product may be stored in an icebox for long periods of time without appreciable diminution in potency.

Example 4

Cancer tissue taken during postmortem from a patient who has died of carcinoma is minced finely under sterile conditions after the majority of the normal tissue is removed therefrom. To 300 grams of this minced tissue is added 600 ccs. of 0.85% sodium chloride in distilled water. This tissue is placed in a sterile flask and inoculated with Cl. histolyticus obtained from the American Type Culture Collection, Chicago, and numbered 4972. This strain has been found to possess the property of self-conversion to Cl. sporogenes. As a result, the microorganism used probably comprises a mixture of Cl. histolyticum, Cl. sporogenes and various intermediate stages between the two. The flask is then sealed with vaseline and mineral oil for anaerobic cultivation in accordance with the usual procedure. The resulting culture is incubated at 37.5° C. until the murky supernatant fluid becomes clear. This incubation period usually requires several days. The culture flask is then placed in a bath of cool running water until the vaseline-oil mixture is semi-solid, whereupon the contents are decanted and strained through glass wool to remove the large particles of solid contained therein. The filtered fluid is then decanted in 50 cc. tubes and centrifuged at 2000 R. P. M. for ½ an hour. The centrifuged fluid is then filtered through a 5 inch N porosity Berkefeld candle. The filtrate from the 5 inch Berkefeld candle is then passed through a 2½ inch N porosity Berkefeld candle, which has been previously autoclaved to sterilization. The resulting sterile filtrate is then bottled under sterile conditions. The last few drops of this filtrate are used for a viability test in order to check the sterility. This product may be stored in an icebox for long periods of time without appreciable diminution in potency.

Example 5

Carcinoma tissue was removed under anaesthetic from a cancerous patient. This tissue, containing small amounts of normal tissue, was finely minced under sterile conditions. To 300 grams of the finely minced tissue was added 600 ccs. of 0.85% sodium chloride in distilled water. This mixture was heated to about 70° C. and maintained at approximately this temperature for about one hour. The mixture was then strained through four layers of cheese cloth. The fluid portion was then filtered through a Green No. 488 filter paper and autoclaved at 15 lbs. steam pressure for 20 minutes (this fluid will hereafter be designated as the 70° C. extract). The residual tissue was recovered and added to 600 ccs. of fresh 0.85% sodium chloride in distilled water. This mixture was autoclaved at about 10 lbs. steam pressure for about one hour. At the end of this time it was strained through four layers of cheese cloth and washed twice with fresh saline solution, each time using about 300 ccs. of the solution. While the residual tissue was still in the cheese cloth it was squeezed to remove excess moisture. To this residual tissue was then added 2 ccs. of the above 70° C. extract, 0.02 gram of ferric citrate, 6 grams dextrose, and 2000 ccs. of 0.85% sodium chloride solution in distilled water. This suspension was adjusted to a pH of 7.4 and autoclaved at 15 lbs. steam pressure for ½ an hour. It was thereupon cooled rapidly in a water bath. The cooled suspension was inoculated with *B. histolyticus*, sealed with vaseline and mineral oil and cultivated under anaerobic conditions until the supernatant fluid became non-colloidal. The resulting incubation mass was then filtered through glass wool and the filtrate centrifuged for about ½ an hour. The centrifuged solution was then filtered through a 5 inch N porosity Berkefeld candle. The filtrate from the 5 inch Berkefeld candle was then rendered sterile by filtering through a 2½ inch N porosity Berkefeld candle. The sterile filtrate was then placed in ampoules under sterile conditions, the last few drops of the filtrate being used for viability.

When the above experiment is repeated using the micro-organism described in Example 3 a product of satisfactory therapeutic characteristics was obtained. Satisfactory results were also obtained by repeating this experiment with the mixture of micro-organisms described in Example 4.

*Example 6*

Cancer tissue obtained during postmortem examination was freed from the major part of the normal tissue present therein. This cancerous material was then finely minced under sterile conditions and 300 grams of it were added to 600 ccs. of 0.85% sodium chloride in distilled water. This mixture was autoclaved for two hours at about 15 lbs. steam pressure. It was then strained through four layers of cheese cloth and the residual tissue was washed twice with 300 ccs. of 0.85% sodium chloride, using fresh saline solution each time. The tissue was squeezed to remove excess saline solution after the aforesaid washing treatment had been completed (the solid matter remaining in the cheese cloth will hereafter be designated as the residual tissue). The filtrate from the aforesaid operation, including the washing solutions, was evaporated to a volume of about 160 ccs. and 40 ccs. concentrated hydrochloric acid were added to the concentrated solution. This solution was then boiled under a reflux condenser for about 5½ hours and finally neutralized with saturated sodium hydroxide. The neutralized concentrated solution was then dialyzed against 3 litres of distilled water for about one hour. It was thereafter dialyzed against 1500 ccs. of 0.85% sodium chloride for about ½ an hour. The dialysate was then made up to 2 litres with 0.85% sodium chloride in distilled water, and this solution was added to the residual tissue which had been obtained as described above. 0.3% dextrose, by weight of dialysate, was added to the resulting suspension, it was autoclaved to sterilization and rapidly cooled in running water. The suspension was then inoculated with *B. histolyticus* and incubated under anaerobic conditions for several days in accordance with standard incubation practices. After incubation, the resulting mass was filtered with the aid of vacuum until all of the liquid had been removed from the solid contents. The filtered fluid was centrifuged at 2500 R. P. M. for about ¾ of an hour. The centrifuged solution was then filtered through a 5 inch N porosity Berkefeld candle, and the filtrate from this operation was filtered through a 2½ inch N porosity Berkefeld candle which had been thoroughly sterilized. A few drops of this sterile solution were tested for viability and the remainder of the solution was bottled under sterile condition.

The above experiment was repeated using the micro-organisms of Examples 3 and 4. The resulting fluid when injected into patients suffering from carcinoma was found to be satisfactory in reducing the pain.

*Example 7*

Carcinoma and carcoma tissue obtained from postmotems and from operations on patients suffering from either of these diseases is kept frozen until a sufficient amount of malignant tissue is obtained to conduct the following experiment. When the necessary amount of tissue is obtained it is removed from the icebox, with appreciable amounts of adherent normal tissue and cut into fine pieces, weighed, and placed in a pyrex glass container such as an Erlenmeyer flask or test-tube. 500 grams of this tissue are then added to the following solution:

1000 ccs. pure distilled water
Sufficient sodium chloride to make the resulting suspension approximately 0.85% concentration NaCl.
Sufficient dextrose to make this suspension approximately 0.3% dextrose.
Sufficient ferric citrate or ferric alum to make this suspension approximately 0.05% of the soluble iron salt.

The suspension of tissue in the above solution is sterilized by heating to a temperature of about 65° C. for one hour each day for five successive days, the mixture being kept in the icebox between periods of treating in order to reduce the possibility of organism growth. The mouth of the Erlenmeyer flask is plugged with clean absorbent cotton during this pasteurization process. At the end of this five day period the container is reopened and the mouth flamed to sterilize it. The contents of the flask are then inoculated with a saline suspension of *B. histolyticum*, as in Example 2 above. The flask is then sealed with a mixture of vaseline and oil, a clean cotton plug is replaced in the mouth of the container and it is placed in an incubator and maintained at a temperature of 37.5° C. for a period of about seven days. As soon as the murky fluid of the culture has cleared the supernatant fluid is withdrawn from the culture flask by suction and centrifuged to free it from the larger particles present in solution. Centrifuging may be accomplished by using a machine operated at 2500 R. P. M. for about ½ an hour. The resulting clear fluid is then filtered through an N porosity Berkefeld candle until viability tests show that it is properly sterilized. It is then sealed in ampoules and stored in an icebox until ready for use.

It is to be understood that the above examples are illustrative merely of practical methods of carrying out my invention. I have found that the liquids produced when a proteolytic microorganism is grown on a protein foreign to the human body possess specific action in the reduction of discomforts resulting from the presence or growth of such proteins in the body. As is clear from the above disclosure, my invention is particularly adapted to the relief of pain resulting from a cancerous condition.

It is to be distinctly understood that the present invention is not represented as having any curative properties whatsoever for cancer or any other foreign protein disease. It is represented solely as a harmless, non-habit forming, pain alleviant for the treatment of cancer.

It is, of course, understood that the methods of making this pain-alleviating substance may be varied widely without departing from the scope of this invention. For example, the foreign protein used may be obtained from the living body by means of an operation under anaesthetic or it may be obtained from postmortem examinations. This protein may be freed from all normal tissue or it may contain appreciable amounts of such tissue when it is inoculated and incubated in accordance with my above described invention. In place of a single type of foreign protein it is possible to utilize foreign and normal proteins acquired from widely different sources. In preparing these proteins for use it should be understood that it is advisable to remove them from the body under as sterile conditions as possible, and to prevent any undue decomposition thereof until they are ready for cultivation. I have found that very satisfactory results may be obtained by using a foreign protein as a base medium for the production of a product which is to be used for the alleviation of pain due to the same type of foreign protein, although entirely dissimilar foreign proteins may be used with good results.

While proteolytic micro-organisms generally are contemplated for use herein it should be understood that B. histolyticus, Cl. sporogenes, or a mixture of the two, including the intermediate phases wherein one changes to the other, are preferred. These micro-organisms appear to have a pronounced activity upon the protein medium, and the resulting liquids appear to be quite satisfactory from a therapeutic standpoint. The numerous other well known proteolytic micro-organisms, either alone or in combination with one another, are contemplated for use although for optimum results it has been my experience that the specific micro-organisms mentioned heretofore in the examples are of maximum value.

In practicing the incubation steps of my process common bacteriological expedients may be relied upon insofar as the conditions of temperature, time, type of solution, concentration of solution, etc., are concerned, and so far as I have been able to determine a variation of these conditions within rather wide ranges does not appreciably injure the pain-alleviating properties of the resulting products.

The solutions produced in accordance with this invention should advisably be stored until used in an icebox or in a location where the temperature is appreciably below that of the ordinary atmosphere. For the practical use of these solutions I prefer intra-muscular injections in the arm or leg of the patient afflicted. For example, if a patient is suffering from carcinoma of the breast or some other portion of the body this treatment may be commenced by injecting into the arm of the patient about 0.3 to about 1.0 cc. of a solution obtained in accordance with the above instructions. The usual reaction from this injection is a prickling or tingling sensation which occurs in the region of the malignancy about ½ to 2 hours after the injection is given. This prickling or tingling sensation may last for from about one hour to about 2 or 3 hours. This injection may be given daily or every two or three days for a period of several months. As the treatment progresses it is possible to increase the dosage one-tenth to three-tenths of a cc. every few injections until finally the patient is receiving from one to three or four ccs. at each treatment. An average dosage of about one to two and one-half ccs. is customary after the patient has been undergoing treatment for two or three weeks. If the arm of the patient becomes irritated from the frequent needle punctures it is possible to make the injections in the other arm or in one of the legs. It should be noted that the injection need not be made in the situs of the malignancy.

After the patient has been receiving this treatment for from two days to two weeks there is customarily noticed a decrease in the amount of pain. As this pain decreases under continued treatment it is possible to reduce the amount of morphine or other opiates which were administered, and in many cases to eliminate altogether the use of such opiates. This decrease in pain is not accompanied by any disagreeable sensations other than the brief prickling or tingling sensation in the region of the malignancy after each injection. With the decrease in pain it is generally noticed that the patient becomes appreciably more cheerful, as would naturally be expected. Likewise, in the great majority of cases it is found that this decrease in pain is also accompanied by an increase in weight which may vary from one or two pounds to more than twenty pounds. Furthermore, this reduction in pain is not accompanied by any deleterious effects, judging from the results obtained from over 25,000 injections.

The duration of this treatment will depend to a great extent upon the condition of the patient, and for ordinary purposes a series of treatments lasting from three to six months is sufficient. In the event that when the treatment is discontinued the pain which has been alleviated thereby subsequently returns it would be advisable to commence a new series of treatments since no harmful effects have been found to result therefrom and the diminution of pain and discomfort is of considerable importance in cancerous diseases and in the growth of foreign proteins generally.

While I do not wish to limit my invention to any particular theory and while very little is known about the growth of foreign proteins in general, and cancer in particular, my observations indicate that the success of my invention may be predicated in part at least upon the following theory. Cancer tissue contains a growth accelerating factor, the exact composition of which is as yet unknown. It also contains a growth inhibiting factor, the composition of which is also as yet unknown, and the function of which is completely negatived by the presence of the much more active growth accelerating factor. When this tissue is seeded and incubated with proteolytic micro-organisms such as B. histolyticus, Cl. sporogenes, and mixtures of the two, the tissue is attacked and the growth accelerating factor is either destroyed or converted to a growth inhibiting factor. Furthermore, the natural growth inhibiting factor which is present therein is not detrimentally affected by the attack of the micro-organism upon the protein constituents of the tissue, and may even be augmented by the conversion of the growth accelerating factor or some other constituent to a growth inhibiting factor. As a result, the liquid produced by this attack of the proteolytic microorganism upon cancer tissue contains a large amount of active growth inhibiting factor and very little, if any, growth accelerating factor. Consequently, when it is injected into the body of a patient afflicted with cancer the growth inhibiting factor contained therein is present in sufficient amounts and possesses a sufficient potency to overcome or at least reduce the effectiveness of the growth accelerating factor present in the cancerous tissue of the patient. The effect of this growth inhibiting factor is, therefore, to decrease the rate at which the cancerous mass adds to itself. Since the pain occasioned by cancer and foreign protein growths is largely due to the pressure created by these growths upon the nervous system of the body anything which retards this growth or prevents it will lessen this damaging pressure upon the nervous system and thereby lessen the pain occasioned by the disease. While this theory appears to explain the physiological action of my new pain-alleviating products it should be understood that it is advanced merely as a theory and that I do not intend to predicate my invention thereupon, because regardless of the correctness of this theory it has been found that products produced in accordance with my invention possess to a noticeable degree the property of reducing the pain and other discomforts resulting from carcinoma, sarcoma, and foreign protein diseases generally.

In line with the above theory I may state that the treatment of any material which will produce a growth inhibiting factor therein or which will increase the effectiveness of such factor normally present therein, and the introduction of the resulting substance into the body of a patient suffering from a disease which depends upon the preponderance of a growth accelerating factor should result in an improvement in the condition of this patient. Likewise, the use of a material which naturally contains a preponderance of growth inhibiting factor should be helpful. Since practically every tissue, normal and diseased, of man and animal, contains some growth inhibiting factor I believe that if this tissue is acted upon in such a way as to increase the effectiveness of this growth inhibiting factor, either by producing more of this factor therein and/or by destroying the growth accelerating factor normally present therein, a product of appreciable value in this connection will thereby be obtained. In pursuance of this thought, it should therefore be understood that my invention in its broadest embodiment contemplates the treatment of any tissue in such manner as to increase the effectiveness of the growth inhibiting factor therein, and the introduction of this effective growth inhibiting factor into the body of a patient suffering from a disease which depends upon a preponderance of growth accelerating factor. This invention also contemplates the treatment of these patients with natural substances which contain a preponderance of growth inhibiting factor.

Within the aforesaid contemplated scope of this invention would be the use as a culture medium of normal tissues and glands of both animals and man; the embryo tissues of animals or man, such as the placenta, embryo liver of the pig, sheep, cat, dog, mouse, rat, chick or the spleen, pancreas, pituitary bodies, pineal glands, thymus, adrenals, thyroid, parathyroid, and other glandular structures; the skin removed at autopsy from malignant or normal animals or man; the liver, kidneys, spleen, pituitary body both anterior and posterior lobes, either singly or together, or the skin, either superficial or deep, removed either surgically or at postmortem from any normal or tumor bearing animal or man; malignant tissues generally from tumor bearing man or animals such as the horse, dog, cat, rabbit, rat, mouse, chicken or bird.

Since malignant tissues such as carcinoma and the like are of particular value in the production of these pain-alleviating products, and since these tissues must contain a great preponderance of growth accelerating factor it would seem that the destruction of these tissues by proteolytic micro-organisms must result in a conversion of the growth accelerating factor to a growth inhibiting factor.

In further pursuance of this theory, it appears that regardless of whether or not a growth accelerating factor is converted to a growth inhibiting factor so long as the ultimate product contains a preponderance of growth inhibiting factor it will be helpful when introduced into the body of a person suffering from an overabundance of growth accelerating factor. The means which I have used for the purpose of increasing what I believe to be a growth inhibiting factor has been the action of proteolytic micro-organisms upon a medium wherein they might increase the effectiveness of the growth inhibiting factor which is normally present therein or which is produced by their attack thereon. As numerous proteolytic micro-organisms are known which are capable of attacking proteins it seems probable that any of these micro-organisms, such as the following, may be used:

*Clostridium butyricum*
*Clostridium putrificium*
*Clostridium sporogenes* (preferred to many others)
*Clostridium multifermentans*
*Escherichia coli*
*Escherichia communior*
*Elbertella typhi*
*Salmonella snipestifer*
*Staphylococcus albus*
*Staphylococcus aureus*
*Staphylococcus citreus*
*Sarcina ventriculi*
*Sarcina lutea*
*Sarcina flava*
*Serratia marcescens*
*Diplococcus pneumoniae*
*Streptococcus pyogenes*
*Streptococcus scarlatinal*
*Streptococcus mastoiditis*
*Streptococcus mitior*
*Streptococcus anhemolyticus*
*Streptococcus liquefaciens*
*Neisseria sicca*
*Micrococcus freudenrichia*
*Micrococcus luteus*
*Micrococcus flavus*
*Micrococcus conglomeratus*
*Micrococcus cereus*
*Acrobacter aerogenes*
*Pseudomonas aeruginosum*
*Pseudomonas liquefaciens*
*Pseudomonas fluorescens*
*Clostridium alcaligenes*
*Vibrio proteus*
*Flavobacterium aquatilis*

*Chromobacterium violaceum*
*Achromobacter liquefaciens*
*Proteus vulgaris*
*Proteus mirabilis*
*Alcaligenes fecalis*
*Bacillus subtilis*
*Bacillus mycoides*
*Bacillus luteus*
*Bacillus fluorescens*
*Bacillus megatherium*
*Bacillus vulgatus*
*Bacillus mesentericus*
*Bacillus esterificans*
*Bacillus pyrocyaneous*

The manner of producing the resulting product would, therefore, seem to depend merely upon utilizing the most advantageous conditions for the attack on the protein by the micro-organism or micro-organisms in order to produce a preponderance of growth inhibiting factor. Since my preferred micro-organisms, referred to above, seem to produce better results when they are incubated under anaerobic conditions in accordance with standard practice this is to be understood as the preferred manner of producing these products. However, where the protein in question may be attacked to better advantage by the micro-organism under some other conditions it is to be understood that such conditions are contemplated as within the scope of this invention.

In carrying out this invention I wish it to be understood that the expedients for the more efficacious production of the products which are set forth in copending applications Serial Nos. 91,904 and 91,905, filed by Schroeder and Allen on July 22, 1936, and by Ely and Schroeder on July 22, 1936, are to be understood as applicable to the present invention. These expedients depend upon various considerations such as regulating the time of incubation of the reaction, carrying out the incubation with the use of a much greater amount of proteolytic micro-organism than is customary, using the therapeutically active substance as a liquid in the subsequent incubation of additional tissue with proteolytic micro-organisms, adding to the products materials which increase their therapeutic effectiveness, utilizing the chemical and physical differences between the substances in order to increase the therapeutic potency of the resulting product such as by the use of dialyzation, ultra filtration, evaporation or precipitation, etc.

This application is a continuation-in-part of my copending application Serial No. 48,673, filed November 7, 1935.

By means of the present invention I have produced a substance which is capable of reducing the discomforts of growths in the human body of proteins foreign thereto. These substances have been found to be of particular value in alleviating or diminishing the pain resulting from cancer. They do not, so far as I have been able to ascertain, possess any harmful effects, and they appear to be distinctly superior to morphine and other opiates which have been used in the past for this purpose.

As many apparently widely different embodiments of this invention may be made without departing from the spirit and scope thereof, it is to be understood that the invention is not limited to the specific embodiments thereof except as defined in the appended claims.

I claim:

1. A process for producing a substance capable of reducing the pain resulting from cancer which comprises growing a proteolytic microorganism on cancer tissue for a sufficient period of time to at least partially decompose said cancer tissue and extracting therefrom the liquid products produced thereby.

2. A process for producing a substance capable of reducing the pain resulting from cancer which comprises growing *B. histolyticus* on cancer tissue for a sufficient period of time to at least partially decompose said cancer tissue and extracting therefrom the liquid products produced thereby.

3. A process for producing a substance capable of reducing the pain resulting from carcinoma which comprises seeding human carcinoma tissue with *B. histolyticus*, incubating the seeded culture medium for a sufficient period of time and under such conditions that the carcinoma tissue is almost completely destroyed, separating the liquid from the solid portion of the resulting incubation mass and sterilizing said liquid.

4. The product produced in accordance with the process defined in claim 1.

5. The product produced in accordance with the process defined in claim 2.

6. The product produced in accordance with the process defined in claim 3.

7. A process for producing a substance capable of reducing the pain resulting from cancer which comprises treating minced cancer tissue with saline solution in order to remove therefrom substantial amounts of soluble constituents, adding to the residual extracted tissue dextrose and saline solution, inoculating it with *B. histolyticus*, incubating it under anaerobic conditions for a sufficient period of time to substantially destroy the tissue and permit the supernatant fluid to become substantially non-colloidal, then filtering and rendering sterile the so-produced solution.

8. A process for producing a substance capable of reducing the pain resulting from cancer which comprises treating minced cancer tissue with saline solution in order to remove therefrom substantial amounts of soluble constituents, acidifying the solution containing said soluble constituents, refluxing it, neutralizing it, dialyzing it, adding to the residual extracted tissue said dialysate, dextrose and saline solution, inoculating it with *B. histolyticus*, incubating it under anaerobic conditions for a sufficient period of time to substantially destroy the tissue and permit the supernatant fluid to become substantially non-colloidal, then filtering and rendering sterile the so-produced solution.

9. The product produced in accordance with the process defined in claim 7.

10. The product produced in accordance with the process defined in claim 8.

HENDRY C. CONNELL.